Patented Jan. 14, 1936

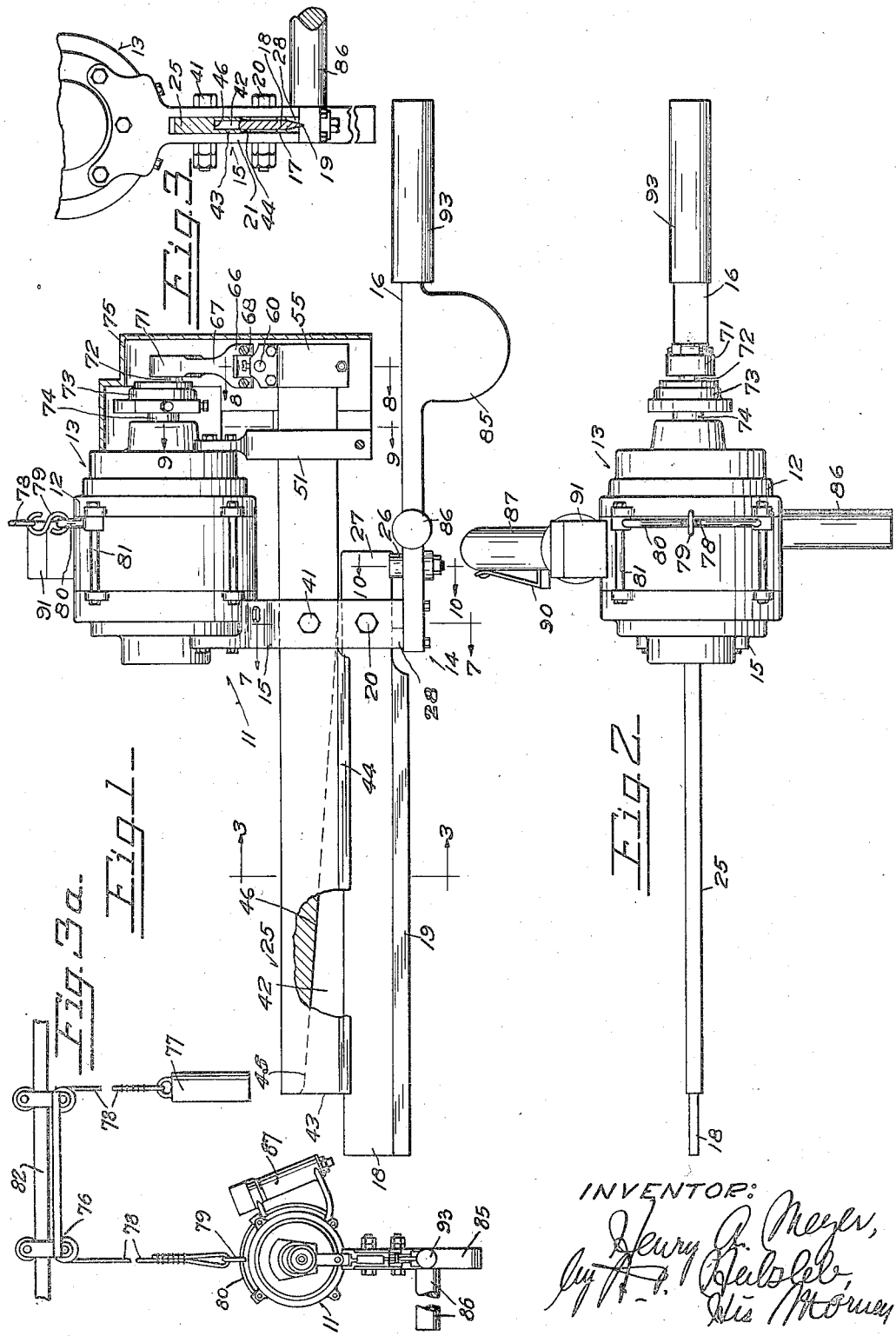

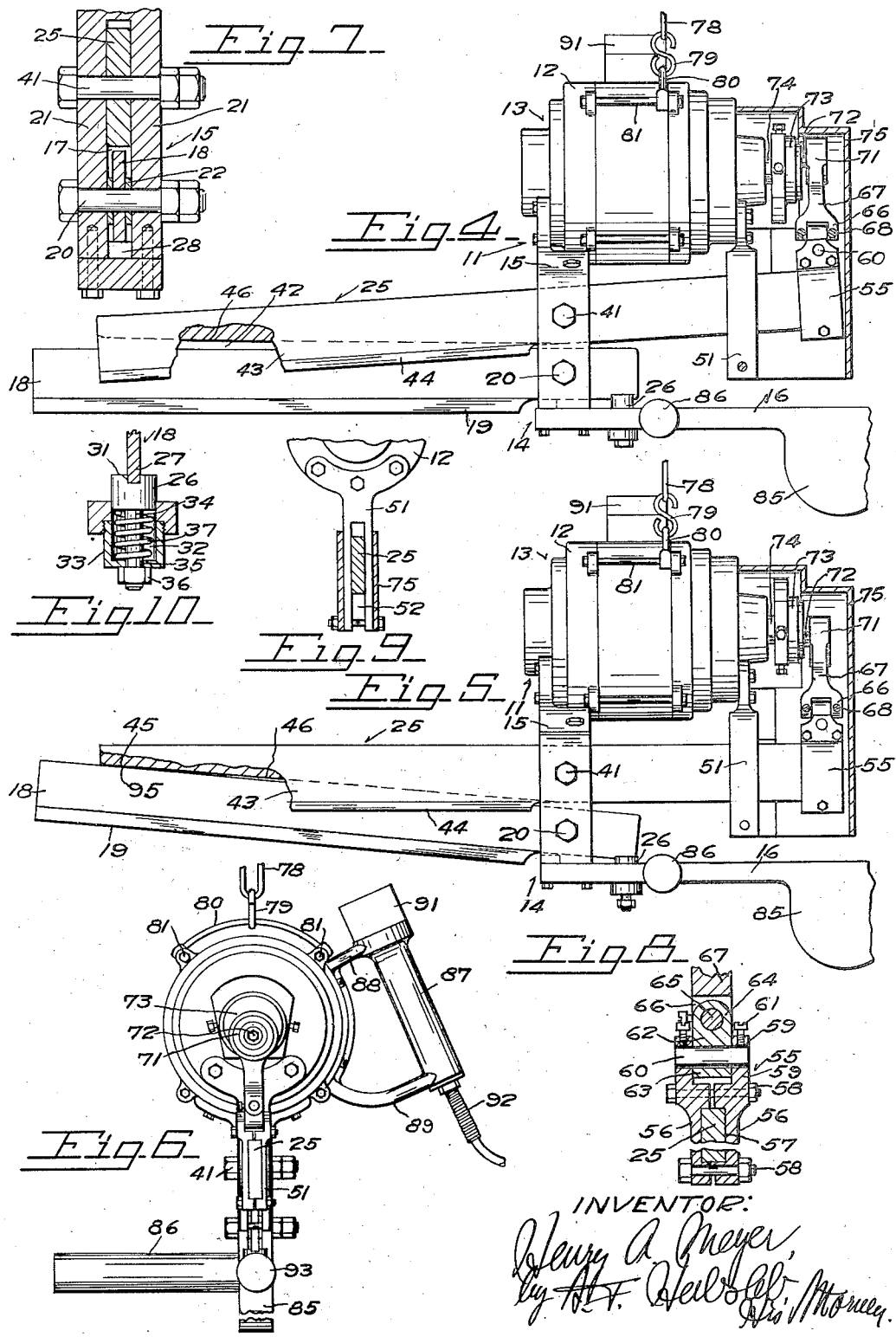

2,027,396

UNITED STATES PATENT OFFICE 2,027,396

CARCASS CLEAVING MACHINE

Henry A. Meyer, Cincinnati, Ohio, assignor of one-half to Wolf Machine Company, Cincinnati, Ohio, a corporation of Ohio Application December 22, 1930, Serial No. 504,003

17 Claims. (Cl. 17—23)

It is the practice in the slaughtering industry to suspend the slaughtered carcass by its hind legs having therebetween a suitable gambrel for spreading the same, and to divide the carcass into halves through its rump bone and vertebrae, either before or after chilling the carcass. This practice prevails with hogs, cattle, sheep and other animals.

This severing has heretofore been done mainly by means of hand operated saws where the bones have been long or hard, as the rump bones of cattle, but principally by means of hand operated cleavers. Power operated saws have also been used for the purpose.

It is the object of my invention to provide improved means for dividing a carcass; further, to provide a power-driven carcass cleaving machine; further, to provide a carcass cleaving machine arranged to be shifted for operating on the carcass and comprising a cleaving blade and means for reciprocating the blade laterally in its plane in the cleaving operation; further, to provide a portable machine comprising a cleaving blade arranged to be shifted to cutting position and means for causing cleaving action upon the blade; further, to provide a cleaving blade and novel actuating means for the blade in the cleaving operation; and, further to provide a portable cleaving machine comprising a cleaving blade arranged to be moved into cutting position while the blade is inactive and actuating means acting on the blade to impel it in cleaving direction.

The invention will be further readily understood from the following description and claims, and from the drawings, in which latter:

Fig. 1 is a side elevation of my improved device, partly in section and partly broken away.

Fig. 2 is a plan view of the same.

Fig. 3 is a sectional detail view, taken on the line 3—3 of Fig. 1.

Fig. 3a is an end view of my improved device shown suspended from a traveling pulley structure, partly broken away.

Fig. 4 is a side elevation of my improved device, partly in section and partly broken away, and showing the blade actuator in assumed position.

Fig. 5 is a similar view showing the cleaving blade in assumed position.

Fig. 6 is a rear end view of my improved device.

Fig. 7 is a cross-sectional detail view of the pivot means for the blade and its actuator, taken on the line 7—7 of Fig. 1, and partly broken away.

Fig. 8 is a cross-sectional detail view of the head of the actuator and its connection with the motor, taken on the line 8—8 of Fig. 1, and partly broken away.

Fig. 9 is a cross-sectional view of the guiding means for the blade actuator, taken on the line 9—9 of Fig. 1, and partly broken away; and, Fig. 10 is a cross-sectional detail view of the positioning means for the blade, partly broken away, taken on the line 10—10 of Fig. 1, and partly broken away.

A frame 11 comprises a motor casing 12 of an electric motor 13 and a bracket 14 extending from said motor casing. This bracket is instanced as comprising a hanger 15 and a rearward extension 16 at the free end of the hanger. The hanger is provided with a slot 17 in which a cleaving blade 18 is mounted, (Figs. 1 and 7). The cleaving blade has a cleaving or cutting edge 19 extending lengthwise thereof. The cleaving blade is pivoted on a bolt 20 mounted in the side walls 21 of said slot 17, and is positioned centrally in said slot by means of washers 22 between said blade and said walls.

The cutting portion of the blade extends beyond the supporting frame. The blade is arranged to be reciprocated in a path coincident with its plane for imparting cleaving or chopping motions to the blade.

The cleaving motions of the cleaving blade are instanced as imparted by an actuator 25, when the blade is moved into the range of movements of the actuator, the actuator preferably normally operating idle, (Figs. 1 and 7). A plunger 26 acts on the heel 27 of the blade for urging the blade into normal position against a stop 28 in the slot 17. (Figs. 1, 7, and 8). The plunger is provided with a slot 31 in which the blade is received. The walls of the slot aid in alining the blade.

The plunger is reciprocable in a bore 32, part of which is in a cup 33 secured to the frame extension 16. The plunger is provided with a stem 34 which extends through a hole 35 in the bottom of the cup. An adjusting nut 36 is threaded to the outer end of the stem, a spring 37 being received about the stem in the bore between the bottom of the cup and the plunger.

The actuator 25 is pivoted on a bolt 41 mounted in the walls 21 (Figs. 1 and 7). The actuator is shown as a blade provided with a slot 42 extending lengthwise thereof, in which the cleaving blade 18 is received. (Figs. 1, 3, 4, and 5). The outer edges of the walls 43 of the slot taper toward the cleaving blade as shown at 44. The actuator 25 also serves as a guide for the cleaving blade, the cleaving blade being guided by the side walls 43. The actuator blade 25 is preferably narrow so as to readily move in the slot being made in the carcass by the cleaving blade.

The actuator 25 is provided with an impact portion 45, shown as part of the top wall 46 of the slot 42, arranged to strike the cleaving blade for imparting cleaving movements to the cleaving blade. (Figs. 1, 4, and 5). The impact portion is slightly arcuate to distribute the blows upon the cleaving blade in the various relative positions of the cleaving blade and impact member.

The frame of the machine is provided with a guide 51 having a guide slot 52, the walls of which form lateral guides for the actuator blade 25. (Figs. 1 and 9).

The actuator has connection with the motor for being operated thereby. This motor is exemplified as an electric motor, although it is to be understood that a motor with other propelling force may be substituted therefor, and other connections between the motor and actuator than those herein exemplified may be employed without departing from the scope of my invention stated in the accompanying claims.

In the present exemplification, the actuator 25 is provided with a head 55 comprising side walls 56 provided with opposed slots 57 in which the actuator blade 25 is received and securely clamped by clamping bolts and nuts 58. The side walls are provided with bearings 59 in which a stud 60 is fixed by screws 61. (Figs. 1 and 8.) A knuckle member 62 has a bearing 63 about said stud and a bearing 64 at right angles thereto in which a stud 65 at right angles to the stud 60 is received. The stud 65 is fixed in bearings 66 of a pitman 67 by means of screws 68. This forms a universal joint between the motor shaft and the actuator.

The pitman has a bearing 71 about a crank pin 72 on a crank plate 73 fixed to the rotor shaft 74 of the motor. (Figs. 1 and 6). A protective hood 75 is received about the operating parts and is suitably secured to stationary portions of the frame.

The device is portable and is suspended by means of a suitable cable 78 received over a suitable overhead traveling pulley structure 76 and having a counterweight 77 attached thereto, the traveling pulley structure being guided on a suitable overhead track 82 extending lengthwise of the path of the carcasses. (Figs. 1, 4, and 6). The cable has attachment with a suitable eye 79 on a strap 80 extending between connecting bolts 81 connecting the casing portions of the motor.

The rearwardly extending portion 16 of the frame comprises a counterbalancing weight 85 for counterbalancing the machine on its suspending device, the counterbalance weight being at one side, namely, in rear of the suspending device, and the overhanging cleaving blade and its guide being at the other side or in front of the suspending device. The counterbalance also minimizes vibration.

A handle 86 extends from one side of the rearward extension 16, being shown at the left side of the same. (Figs. 1, 2, and 6). A handle 87 is mounted on the motor casing, being shown supported therefrom by brackets 88, 89, at the right side of the motor. This handle has a switch lever 90 in connection therewith, for operating an electric switch in a switch box 91 on said handle. The hand of the operator is received about the handle 87 and said switch lever so as to control actuation of the motor by the hand of the operator grasping the handle 87. A suitable electric conduit 92 extends from the handle and has suitable electric conductors therein leading to the switch and electric motor from a suitable supply of electric energy. The rear end of the frame is provided with a handle 93.

In manipulating the machine, the operator grasps the handle 86 with his left hand and, if he wishes to tilt the machine, for instance for inclining the cleaving blade in upward direction, he grasps the handle 93 with his right hand for directing the cleaving blade. He may also direct the cleaving blade by grasping the handle 87 with his right hand and manipulating the machine by means of the handles 86, 87.

In cleaving operations upon carcasses, for which my device is primarily intended, the cleaving blade is positioned for beginning the cleaving by positional manipulation of the machine preferably while the cleaving blade is relatively at rest, that is, is not being reciprocated by the motor.

A positioning of the cutting edge of the cleaving blade to exact position on the carcass is made easy by inactive relation of the cleaving blade, as the cleaving blade can in such relation be accurately laid upon the intended line of cut on the carcass. In its normal idle position the cleaving blade preferably extends substantially horizontally from the frame when in normally suspended relation. The cleaving blade may, however, be tilted upwardly or downwardly, or be normally in upwardly or downward tilting relation, and may be moved into desired relations by the handles.

The carcass to be cleaved is in usual practice suspended in front of the operator and may have traveling motion imparted thereto. The operator usually stands on a platform with the butt portion of the carcass in which the beginning of the cleaving is to be made on a level with or above the head of the operator. The operator manipulates the suspended machine, bringing it to proper elevation with relation to the carcass, and tilting the blade if desired. The operator then exerts pressure upon the cleaving blade in cutting direction by downward or tilting movements upon the handles, depending on the positional relation between that portion of the carcass and the cleaving blade.

The operator causes reciprocation of the actuator 25 by pressing upon the switch lever 90, or he may do this while positioning the cleaving blade.

This initial operation of the actuator is an idle operation with relation to the cleaving blade. The extreme retraction of the actuator from the cleaving blade is exemplified in Fig. 1, and the extreme approach of the actuator toward the cleaving blade while the latter is in idle relation is exemplified in Fig. 4, as note the idle space between the impact portion 45 of the actuator and the coacting portion 95 of the cleaving blade. It will be noticed that throughout such idle motion, the guiding relation between the cleaving blade and the actuator is maintained by the overlapping relation of the guiding walls of the actuator blade and the cleaving blade.

In cleaving a carcass there is preferably an initial idle movement between the actuator and the cleaving blade, during which the operator positions the cleaving blade on the carcass. An operative relation between the actuator and the cleaving blade is preferably only established after the operator exerts pressure in cutting direction upon the cleaving blade. The pressure upon the cleaving blade causes approach between the cleaving blade and the actuator, swinging the cleaving blade on its pivot 20 against resistance of the plunger 26, this plunger tending normally to return the cleaving blade to normal position.

When sufficient pressure has been exerted upon the cleaving blade in cutting direction to bring the contact portion of the cleaving blade into the range of movement of the contact portion of the actuator, impulses in cutting direction are imparted to the cleaving blade for causing cutting of the cleaving blade into the carcass. These impulses are preferably initially slight until the cutting edge of the cleaving blade is correctly seated in the carcass in its intended line of cut, whereupon pressure by the operator upon the cleaving blade is gradually increased until the full operative effect and movement of the actuator 25 upon the cleaving blade is obtained. Such latter relation of parts is exemplified in Fig. 5.

The operator continues to exert full pressure in cutting direction upon the cleaving blade, the cutting impacts of the actuator causing cutting movement of the cleaving blade in the carcass. The cutting movements take place in quick succession and may be supplemented by the cutting pressure exerted by the operator in cutting direction. This causes substantially continuous and smooth cutting of the carcass.

My improved device permits clean and rapid cutting of the bone and meat of the carcass, avoids bone dust, and provides bright cut surfaces on the bones. If desired, the operator may momentarily suspend operation of the motor and cause cutting of fleshy portions of the carcass by manipulation of the machine through the medium of its handles for causing slashing cuts by the cleaving blade through meat portions of the carcass in imitation of hand manipulation of a hand cleaver.

I have preferred to show the operating connections between the motor and the cleaving blade by means of an impact member, although if desired such motor connections may be made direct with the cleaving blade, and the spaced operative relation between the motor connections and the cleaving blade may be omitted, without departing from the scope of my invention set forth in the accompanying claims.

The overhanging portion of the cleaving blade may be sufficiently long to reach entirely through the portions of the carcass being cut, and the speed of reciprocation of the cleaving blade be sufficiently high to provide continuous and clean cutting of the bone and meat of the carcass, it being found that a speed of approximately 1600 complete reciprocations of the actuator per minute produces excellent work. This speed is given merely as an exemplification and not as a limitation.

My improved device is simple, strong and durable, and contains few parts, and its cleaving blade is readily directed to exact position, and may in such position be pressed in cutting direction for instant and effective cutting of the part contacted, and for rapid progress of the cutting through the entire portion of the carcass to be cut.

My improved device is also readily guided in the cutting operation and vibration of the cleaving knife and of the machine is minimized.

Having thus fully described my invention, what I claim as new, and desire to secure by Letters Patent, is:

1. In a carcass cleaving machine, the combination of a portable frame, a cleaving blade having a cutting edge at one end thereof extending longitudinally of the cleaving blade, pivot mounting means therefor on said portable frame for swinging cleaving movements of said cleaving blade in the plane of said blade, means on said portable frame for imparting said swinging cleaving movements to said cleaving blade, said last-named means and the pivot of said pivot mounting means being at the other end of said cleaving blade, spring means normally holding said cleaving blade in operatively separated relation from said last-named means, and means permitting operative approach of said cleaving blade toward said last-named means for changing the extents of said swinging cleaving movements of said cleaving blade.

2. In a carcass cleaving machine, the combination of a portable frame, a cleaving blade having a cutting edge extending longitudinally of the cleaving blade to one side of said portable frame, pivot means pivotally mounting said cleaving blade on said frame for swinging cleaving movements of said cleaving blade in the plane of said blade, means on said frame for imparting said swinging cleaving movements to said cleaving blades, said last-named means normally operatively spaced from said cleaving blade, spring means whereby to qualify the spaced relation between said cleaving blade and said last-named means, means for pivotally suspending said portable frame, and handles on said frame for angularly positioning said portable frame for positioning said cutting edge on the carcass.

3. In a carcass cleaving machine, the combination of a frame, a cleaving blade and a complemental actuator blade pivoted in superposed arrangement on said frame, operating means for said actuator blade, and means normally causing separation between said cleaving blade and said actuator blade, and arranged for permitting approach between said actuator blade and said cleaving blade by pressure of said cleaving blade on the carcass.

4. In a carcass cleaving machine, the combination of a frame, a cleaving blade and a complemental actuator blade pivoted in superposed arrangement on said frame, said cleaving blade and said actuator blade having complemental guiding means, operating means for said actuator blade, and means normally causing separation between said cleaving blade and said actuator blade, and arranged for permitting approach between said actuator blade and said cleaving blade by pressure of said cleaving blade on the carcass.

5. In a carcass cleaving machine, the combination of a frame, a cleaving blade pivoted thereto, a complemental actuator pivoted to said frame, and means yieldingly positioning said cleaving blade in inactive relation to said actuator, and arranged for permitting approach between said actuator and said cleaving blade upon pressure of said cleaving blade on the carcass.

6. In a carcass cleaving machine, the combination of a frame, a cleaving blade pivoted thereto, an actuator blade pivoted to said frame parallel with said cleaving blade, said blades provided with complemental guiding means for maintaining parallelism between them, and resilient means normally causing recession between said blades, and arranged for permitting approach between said blades by pressure of said cleaving blade on the carcass.

7. In a carcass cleaving machine, the combination of a portable frame, a cleaving blade having a cleaving portion for the carcass extending lengthwise outwardly from said frame in the direction of length of said cleaving blade, pivot mounting means on said portable frame for said cleaving blade for pivotal swinging movements of said cleaving portion of said cleaving blade in the plane of said blade, an actuating part for said cleaving blade, operating means for said actuating part for imparting said swinging cleaving movements, said pivot mounting means and said operating means being located solely at the frame end of said cleaving blade outside the path of movement of said cleaving portion thereof and means for mounting the frame for downward feeding movement during the cleaving operation, said cleaving portion and said frame having different paths during said downward feeding movement.

8. In a carcass cleaving machine, the combination of a portable frame, a cleaving blade having a cleaving portion for cleaving the carcass extending lengthwise outwardly from said frame in the direction of length of said cleaving blade, pivot mounting means on said portable frame for said cleaving blade for pivotal swinging cleaving movements of said cleaving portion of said cleaving blade in the plane of said blade, an actuating part for said cleaving blade, operating means for said actuating part for imparting said swinging cleaving movements, said pivot mounting means and said operating means being located solely at said frame end of said cleaving blade outside the path of movement of said cleaving portion thereof, and pivotal supporting means for downward feeding movements of said frame, said pivotal supporting means having pivotal connection with said frame wholly at said last-named end, said cleaving portion having a different path of downward feeding movement from the paths of downward feeding movements of said pivot mounting means and operating means.

9. In a carcass cleaving machine, the combination of a portable frame including a driving motor, a cleaving blade having a cleaving portion for cleaving the carcass extending lengthwise outwardly from said frame in the direction of length of said cleaving blade, pivot mounting means on said portable frame for said cleaving blade for pivotal swinging cleaving movements of said cleaving portion of said cleaving blade in the plane of said blade, said cleaving portion having a downwardly presented cutting edge, an actuating part for said cleaving blade, and operating connections between said motor and said actuating part, said frame being mounted for downward feeding movement during the cleaving operation, said pivot mounting means and said operating connections being located solely at said frame end of said cleaving blade outside the path of downward feeding movement of said cleaving portion during the carcass cleaving operation.

10. In a carcass cleaving machine, the combination of a portable frame including a driving motor, a cleaving blade having a cleaving portion for cleaving the carcass extending lengthwise outwardly from said frame in the direction of length of said cleaving blade, pivot mounting means on said portable frame for said cleaving blade for pivotal swinging cleaving movements of said cleaving portion of said cleaving blade in the plane of said blade, an actuating part for said cleaving blade, operating connections between said motor and said actuating part, said pivot mounting means and said operating connections being located solely at said frame end of said cleaving blade outside the path of movement of said cleaving portion during the carcass cleaving operation, and pivotal supporting means for said frame for downward feeding movement during the cleaving operation, said pivotal supporting means having pivotal connection with said frame solely at said last-named end, and said cleaving portion having a different path of downward feeding movement from the downward path of feeding movement of said pivot mounting means and said operating connections.

11. In a carcass cleaving machine, the combination of a portable frame, a cleaving blade having a cleaving portion, said cleaving portion extending beyond said frame in the direction of length of said cleaving blade, so as to dispose said cleaving portion and said frame in end to end relation, pivot mounting means on said portable frame for said cleaving blade for pivotal swinging movements of said cleaving portion of said cleaving blade in the plane of said blade, an actuating part for said cleaving blade, and operating means for said actuating part for imparting said swinging movements, said pivot mounting means and said operating means being located solely at the frame end of said cleaving blade.

12. In a carcass cleaving machine arranged for descent lengthwise of a suspended carcass during the cleaving operation, the combination of a portable frame, a cleaving blade having a cleaving portion which extends beyond said frame in the direction of length of said cleaving blade so as to dispose said cleaving portion and said portable frame in different paths during said descent, pivot mounting means on said portable frame for said cleaving blade for pivotal swinging movements of said cleaving portion of said cleaving blade in the plane of said blade, an actuating part for said cleaving blade, and operating means on said portable frame for said actuating part for imparting said swinging cleaving movements, said pivot mounting means and said operating means being located solely at the frame end of said cleaving blade.

13. In a carcass cleaving machine arranged for descent lengthwise of a suspended carcass during the cleaving operation, the combination of a portable frame, a cleaving blade having a cleaving portion which extends beyond said frame in the direction of length of said cleaving blade so as to dispose said cleaving portion and said portable frame in different paths during said descent, pivot mounting means on said portable frame for said cleaving blade for pivotal swinging movements of said cleaving portion of said cleaving blade in the plane of said blade, an actuating part for said cleaving blade normally spaced from said cleaving blade, and operating means on said portable frame for said actuating part for imparting said swinging movements, said pivot mounting means and said operating means being located solely at said frame end of said cleaving blade.

14. In a carcass cleaving machine arranged for descent lengthwise of a suspended carcass during the cleaving operation, the combination of a portable frame including a driving motor, a cleaving blade having a cleaving portion which extends beyond said frame in the direction of length of said cleaving blade so as to dispose said cleaving portion and said portable frame in different paths during said descent, pivot mounting means on said portable frame for said cleaving blade for pivotal swinging movements of said cleaving portion of said cleaving blade in the plane of said blade, an actuating part for said cleaving blade, and operating connections between said motor and said actuating part, said pivot mounting means and said operating connections being located solely at the frame end of said cleaving blade.

15. In a carcass cleaving machine arranged for descent lengthwise of a suspended carcass during the cleaving operation, the combination of a portable frame, a cleaving blade having a cleaving portion, pivot mounting means on said portable frame for said cleaving blade for pivotal swinging chopping movements of said cleaving portion in the plane of said blade in simulation of the movements of a hand-operated cleaver, an actuating part for said cleaving blade, and operating means for said actuating part, said pivot mounting means and said operating means being located on said frame solely at one end of said cleaving portion.

16. In a carcass cleaving machine arranged for descent lengthwise of a suspended carcass during the cleaving operation, the combination of a portable frame, a cleaving blade having a cleaving portion, pivot mounting means for said cleaving blade on said portable frame solely at one end of said cleaving portion, an actuating part for said cleaving blade, and operating means for the latter on said frame at the same end of said cleaving portion, said actuating part acting on said cleaving blade at the side of the pivot of said cleaving blade for pivotal swinging chopping movements of said cleaving portion in the plane of said blade in simulation of the movements of a hand-operated cleaver.

17. In a carcass cleaving machine arranged for descent lengthwise of a suspended carcass during the cleaving operation, the combination of a portable frame, a cleaving blade having a cleaving portion, pivot mounting means for said cleaving blade on said portable frame solely at one end of said cleaving portion, an actuating part for said cleaving blade, said actuating part normally spaced from said cleaving blade, and operating means for the latter on said frame at the same end of said cleaving portion, said actuating part acting on said cleaving blade at the side of the pivot of said cleaving blade for pivotal swinging chopping movements of said cleaving portion in the plane of said blade in simulation of the movements of a hand-operated cleaver.

HENRY A. MEYER.

CERTIFICATE OF CORRECTION.

Patent No. 2,027,396. January 14, 1936.

HENRY A. MEYER.

It is hereby certified that the name of the assignee of one-half interest in the above numbered patent was erroneously described and specified as "Wolf Machine Company" whereas said name should have been described and specified as The Wolf Machine Company, of Cincinatti, Ohio, a corporation of Ohio, as shown by the records of assignments in this office; page 3, second column, line 31, claim 2, for "blades" read blade; and that the said Letters Patent should be read with these corrections therein that the same may conform to the record of the case in the Patent Office.

Signed and sealed this 3rd day of March, A. D. 1936.

(Seal)

Leslie Frazer
Acting Commissioner of Patents.